US012409551B2

United States Patent
Li et al.

(10) Patent No.: US 12,409,551 B2
(45) Date of Patent: Sep. 9, 2025

(54) CABLE FORCE CONTROL METHOD APPLICABLE TO TIME-VARYING CONFIGURATION

(71) Applicant: SOUTHEAST UNIVERSITY, Jiangsu (CN)

(72) Inventors: Huijun Li, Jiangsu (CN); Ye Lu, Jiangsu (CN); Aiguo Song, Jiangsu (CN); Ye Li, Jiangsu (CN); Baoguo Xu, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 106 days.

(21) Appl. No.: 18/398,031

(22) Filed: Dec. 27, 2023

(65) Prior Publication Data

US 2024/0189995 A1 Jun. 13, 2024

Related U.S. Application Data

(63) Continuation of application No. PCT/CN2023/072773, filed on Jan. 18, 2023.

(30) Foreign Application Priority Data

Dec. 12, 2022 (CN) .......................... 202211590778.3

(51) Int. Cl.
  *B25J 9/16* (2006.01)
  *B25J 9/10* (2006.01)
(52) U.S. Cl.
  CPC ............. *B25J 9/1633* (2013.01); *B25J 9/104* (2013.01); *B25J 9/1653* (2013.01)
(58) Field of Classification Search
  CPC ......... B25J 9/1633; B25J 9/104; B25J 9/1653
  (Continued)

(56) References Cited

U.S. PATENT DOCUMENTS 11,230,010 B2 * 1/2022 Ueda ...................... B25J 9/1015
12,070,862 B2 * 8/2024 Shimodaira ............ B25J 9/1687
(Continued)

FOREIGN PATENT DOCUMENTS

| CN | 103735389 | 4/2014 |
| CN | 110420107 | 11/2019 |

(Continued)

OTHER PUBLICATIONS

"International Search Report (Form PCT/ISA/210) of PCT/CN2023/072773", mailed on Aug. 18, 2023, pp. 1-4.
(Continued)

*Primary Examiner* — Kira Nguyen
(74) *Attorney, Agent, or Firm* — JCIPRNET

(57) ABSTRACT

A cable force control method includes: establishing a friction model, and calibrating parameters; and calculating the parameters in real time, and controlling a force: identifying the parameters according to the friction model to obtain parameters of an auxiliary cable Bowden system and a power Bowden system: a friction coefficient $\mu^a$ of the auxiliary cable Bowden system, and a friction coefficient $\mu^p$ of the power cable Bowden system; calculating the auxiliary cable Bowden system $\theta^a$ in real time according to the model and a force value of a sensor, and using same as a cable bending angle of the power cable Bowden system $\theta^p$; and obtaining an inverse control formula $F_{in}=F_{out} \cdot e^{-\mu\lambda\theta}$ according to the friction model, and bringing the power cable Bowden system $\theta^p$ into the inverse control formula to serve as a feedforward controller, so as to achieve an effect of real-time force control.

4 Claims, 4 Drawing Sheets

(58) Field of Classification Search
USPC .......................................................... 700/262
See application file for complete search history.

(56) References Cited

U.S. PATENT DOCUMENTS

| | | | |
|---|---|---|---|
| 2009/0066100 A1* | 3/2009 | Bosscher | ............. B25J 17/0266 |
| | | | 901/30 |
| 2017/0340506 A1 | 11/2017 | Zhang et al. | |
| 2017/0348176 A1* | 12/2017 | Herr | ....................... B25J 9/0006 |
| 2020/0306995 A1* | 10/2020 | Yerazunis | ............ B25J 15/0009 |

FOREIGN PATENT DOCUMENTS

| | | |
|---|---|---|
| CN | 113146617 | 7/2021 |
| CN | 113510693 | 10/2021 |

OTHER PUBLICATIONS

"Written Opinion of the International Searching Authority (Form PCT/ISA/237) of PCT/CN2023/072773", mailed on Aug. 18, 2023, pp. 1-3.

* cited by examiner

Identify parameters to obtain friction coefficients of an auxiliary cable Bowden system and a power cable Bowden system

Estimate an angle according to a proximal force sensor and a distal force sensor of the auxiliary cable Bowden system

Control a force according to a feedforward inverse controller through an angle estimation result of a mode and a proximal force sensor of the power cable Bowden system

FIG. 1

CABLE FORCE CONTROL METHOD APPLICABLE TO TIME-VARYING CONFIGURATION

CROSS-REFERENCE TO RELATED APPLICATION

This application is a continuation of international application of PCT application serial no. PCT/CN2023/072773 filed on Jan. 18, 2023, which claims the priority benefit of China application no. 202211590778.3 filed on Dec. 12, 2022. The entirety of each of the above mentioned patent applications is hereby incorporated by reference herein and made a part of this specification.

BACKGROUND

Technical Field

The present disclosure belongs to the technical field of robots, relates to a wearable exoskeleton robot technology, and in particular to a force sensor based cable force control method applicable to a time-varying configuration.

Description of Related Art

A cable-driven system mechanically transmits torque through a cable and a Bowden cable tube, and generally consists of a hollow outer sheath and an inner cable. With light weight, low inertia and excellent flexibility, the cable-driven system is more attractive to a wearable exoskeleton robot relative to other solutions based on a transmission shaft or gear. However, a non-linear relation between a proximal force and a distal force deteriorates control performance of the system.

In order to reduce a non-linear effect, scholars have extensively studied a transmission characteristic model. Study of control methods can be divided into three categories: feedforward control, feedback control and compound control combining feedforward and feedback control. The feedback control is indirectly completed through a force sensor or a change of spring torque. However, an end sensor will limit displacement of the cable, thereby affecting flexibility. Combination between force feedback information from a distal end and feedforward is another method to improve force control, which can reduce accuracy of a feedforward model. However, the compound control requires the force sensor to be mounted at the distal end, which limits flexibility of an end device such as a surgical robot. The feedforward control has been extensively studied considering practicability and complexity strategies of control. However, the existing study is based on fixed position modeling of the cable system, and ignores the situation that actual robot motion will affect a shape of the cable system. In view of this, force control in a time-varying configuration is a challenging problem.

SUMMARY

In order to solve the above problem, the present disclosure provides a magnetorheological damper and force sensor based cable force control method applicable to a time-varying configuration. The present disclosure is implemented through a force sensor and a self-made magnetorheological damper on the basis of a self-built experimental platform; and a friction coefficient and other model parameters are calibrated before a cable system is used, and then in a process of using the cable system, a bending angle is estimated according to an algorithm provided in the present disclosure, thereby achieving real-time force control.

In order to achieve the above objective, the present disclosure provides the following technical solution:

a cable force control method applicable to a time-varying configuration includes:

step 1, establishing a friction model, and calibrating parameters, where a quasi-static equilibrium equation of a (s+ds) segment in a cable is indicated as:

$$\begin{cases} dF(s,t) = \lambda f(s,t) \\ f(s,t) = \mu N(s,t) \\ N(s,t) = F(s,t)\kappa(s,t)ds \\ F'(s,t) = [F(s+ds,t) - F(s,t)]/ds \end{cases} \quad (1)$$

where $F(s,t)$, $F(s+ds,t)$, $N(s,t)$, $f(s,t)$ and $\kappa(s,t)$ indicate a cable tension at a position s, a cable tension at a position s+ds, a positive pressure, a friction force and curvature respectively under the condition of time t; $\lambda = \text{sign}[F'(s)]$ is currently defined, such that $$\frac{F'(s,t)}{F(s,t)} = \mu\lambda\kappa(s,t) \quad (2)$$

is obtained according to formula (1), where $\lambda$ indicates a direction of cable friction; then formula (2) is integrated on an interval (s+ds), such that the following expression $$F(s+ds,t) = F(s,t) \cdot e^{\mu\lambda \int_s^{s+ds} \kappa(s,t)ds} \quad (3)$$

is obtained;

the above expressions are extended to a total length L, such that $$F(L,t) = F(0,t) \cdot e^{\mu\lambda\theta} \text{ is obtained,} \quad (4)$$

where $\mu$ and $\theta$ indicate a friction coefficient and a total bending angle of the cable respectively; $F_{out}=F(L,t)$, $F_{in}=F(0,t)$ is currently set, such that $$\theta = \frac{\ln\left(\frac{F_{out}}{F_{in}}\right)}{\mu\lambda} \quad (5)$$

is obtained by means of formula (4); and in order to reduce an error between the model and experimental data, the parameter $\mu$ is optimized according to the following optimization rule:

$$\min \frac{\sum_{i=1}^{N}(F_{out} - \hat{F}_{out})^2}{N}, \quad (6)$$

where $F_{out}$, $\hat{F}_{out}$ and N indicate a force value actually measured, a force value predicted by the model and the times of sampling respectively; and step 2, calculating the parameters in real time, and controlling a force, which include:

S1, identifying the parameters according to the friction model to obtain parameters of an auxiliary cable Bowden system and a power Bowden system: a friction coefficient $\mu^a$ of the auxiliary cable Bowden system, and a friction coefficient $\mu^p$ of the power cable Bowden system;

S2, calculating the auxiliary cable Bowden system $\theta^a$ in real time according to the model and a force value of a sensor, and using same as a cable bending angle of the power cable Bowden system $\theta^p$; and S3, obtaining an inverse control formula $F_{in}=F_{out} \cdot e^{-\mu\lambda\theta}$ use according to the friction model, and bringing the power cable Bowden system $\theta^p$ into the inverse control formula to serve as a feedforward controller, so as to achieve an effect of real-time force control.

Further, in S1, a proximal force is defined as an input force and a distal force is defined as an output force through tension sensors on the auxiliary cable Bowden system and the power cable Bowden system, and the parameters when an error is minimum are defined as $\mu^a$ and $\mu^p$ by means of calculation of formula (6).

Further, in S2, the auxiliary cable Bowden system sets an expected sinusoidal input, and the auxiliary cable Bowden system $\theta^a$ is calculated through formula (5).

Further, in S3, an expected force value at a distal end of the power cable Bowden system is set, a corresponding expected input value is obtained by means of an inverse control model $F_{in}=F_{out} \cdot e^{-\mu\lambda\theta}$ and an angle value of the power cable Bowden system is calculated in real time by the auxiliary cable Bowden system.

Compared with the prior art, the present disclosure has the following advantages and beneficial effects:

the method can achieve an effect of real-time force control, overcomes a difficulty in force control caused by a change of a cable Bowden configuration in a wearable cable robot, and effectively improves accuracy of the force control of a cable Bowden system under the time-varying configuration.

BRIEF DESCRIPTION OF THE DRAWINGS

FIG. 1 is a flow chart of a cable force control method applicable to a time-varying configuration according to an example of the present disclosure.

DESCRIPTION OF REFERENCE NUMERALS

1—motor fixing seat, 2—synchronous wheel, 3—belt, 4—electric motor, 5—cable reel, 6—slip ring, 7—slip ring fixing seat, 8—magnetorheological damper tail end fixing seat, 9—large pulley, 10—magnetorheological damper, 11—magnetorheological damper head end fixing seat, 12—module base, 13—reel fixing seat, 14—magnetorheological damper module, 15—electric push rod, 16—tension sensor, 17—cable guide seat, 18—auxiliary cable Bowden system, 19—power cable Bowden system, 20—cable fixing seat, and 21—spring.

DESCRIPTION OF THE EMBODIMENTS

The technical solution provided in the present disclosure is described in detail below in combination with the specific examples. It should be understood that the following particular embodiments only serve to describe the present disclosure and not to limit the scope of the present disclosure.

A flow chart of a cable force control method applicable to a time-varying configuration according to the present disclosure is shown in FIG. 1. The cable force control method applicable to a time-varying configuration includes:

step 1, establish a friction model, and calibrate parameters, where

Figure 2:
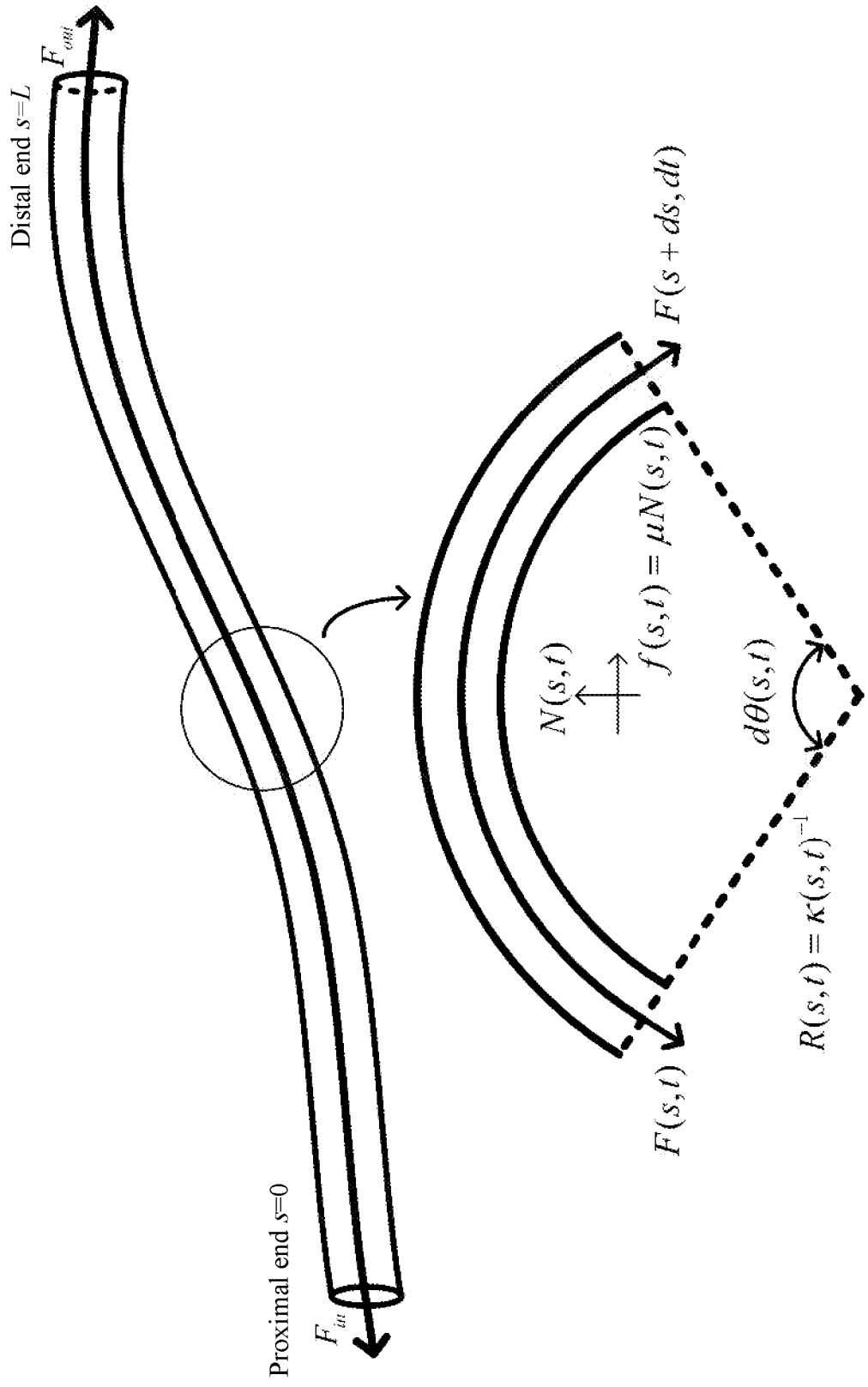
FIG. 2 is a schematic diagram of parameters derived from a friction model according to the present disclosure.

FIG. 2 is a schematic diagram of parameters derived from the friction model, and a quasi-static equilibrium equation of a (s+ds) segment in a cable is indicated as:

$$\begin{cases} dF(s,t) = \lambda f(s,t) \\ f(s,t) = \mu N(s,t) \\ N(s,t) = F(s,t)\kappa(s,t)ds \\ F'(s,t) = [F(s+ds,t) - F(s,t)]/ds \end{cases} \quad (1)$$

where $F(s,t)$, $F(s+ds,t)$, $N(s,t)$, $f(s,t)$ and $\kappa(s,t)$ indicate a cable tension at a position s, a cable tension at a position s+ds, a positive pressure, a friction force and curvature respectively under the condition of time t; $\lambda=\text{sign}[F'(s)]$ is currently defined, such that $$\frac{F'(s,t)}{F(s,t)} = \mu\lambda\kappa(s,t) \quad (2)$$

is obtained according to formula (1), where $\lambda$ indicates a direction of cable friction, is greater than zero, which indicates the friction force is consistent with a trend of cable motion, and is less than zero, which indicates that the friction force is opposite the trend of cable motion. then formula (2) is integrated on an interval (s+ds), such that the following expression $$F(s+ds,t) = F(s,t) \cdot e^{\mu\lambda \int_s^{s+ds} \kappa(s,t)ds} \quad (3)$$

is obtained;

the above expressions are extended to a total length L, such that $$F(L,t)=F(0,t) \cdot e^{\mu\lambda\theta} \text{ is obtained,} \quad (4)$$

where $\mu$ and $\theta$ indicate a friction coefficient and a total bending angle of the cable respectively; $F_{out}=F(L,t)$, $F_{in}=F(0,t)$ is currently set, such that $$\theta = \frac{\ln\left(\frac{F_{out}}{F_{in}}\right)}{\mu\lambda} \quad (5)$$

is obtained by means of formula (4); and in order to reduce an error between the model and experimental data, the parameter $\mu$ is optimized according to the following optimization rule:

$$\min \frac{\sum_{i=1}^{N}(F_{out} - \hat{F}_{out})^2}{N}, \quad (6)$$

where $F_{out}$, $\hat{F}_{out}$ and N indicate a force value actually measured, a force value predicted by the model and the times of sampling respectively; and step 2, calculate the parameters in real time, and control a force. The step includes:

S1, identify the parameters according to the friction model to obtain parameters of an auxiliary cable Bowden system and a power Bowden system: a friction coefficient $\mu^a$ of the auxiliary cable Bowden system, and a friction coefficient $\mu^p$ of the power cable Bowden system.

Specifically, an electric motor 4 transmits moment to a magnetorheological damper 10 by means of a synchronous wheel 2 and a belt 3, and actual output moment of the magnetorheological damper is controlled by controlling a current of a slip ring 6, and the moment generates tension on the cable fixed on a cable reel by means of the cable reel 5. A proximal force is defined as an input force and a distal force is defined as an output force through tension sensors on the auxiliary cable Bowden system 18 and the power cable Bowden system 19, and the parameters when an error is minimum are defined as $\mu^a$ and $\mu^p$ by means of calculation of formula (6).

S2, calculate the auxiliary cable Bowden system $\theta^a$ in real time according to the model and a force value of a sensor, and use same as a cable bending angle of the power cable Bowden system $\theta^p$.

The auxiliary cable Bowden system sets an expected sinusoidal input, and the auxiliary cable Bowden system $\theta^a$ is calculated through formula (5). Since the auxiliary cable Bowden system and the power cable Bowden system are fixed side by side, the bending angles of the two systems may be approximately equal, i.e. $\theta^p = \theta^a$.

S3, obtain an inverse control formula $F_{in} = F_{out} \cdot e^{-\mu\lambda\theta}$ according to the friction model, and bring the power cable Bowden system $\theta^p$ into the inverse control formula to serve as a feedforward controller, so as to achieve an effect of real-time force control.

Figure 3:
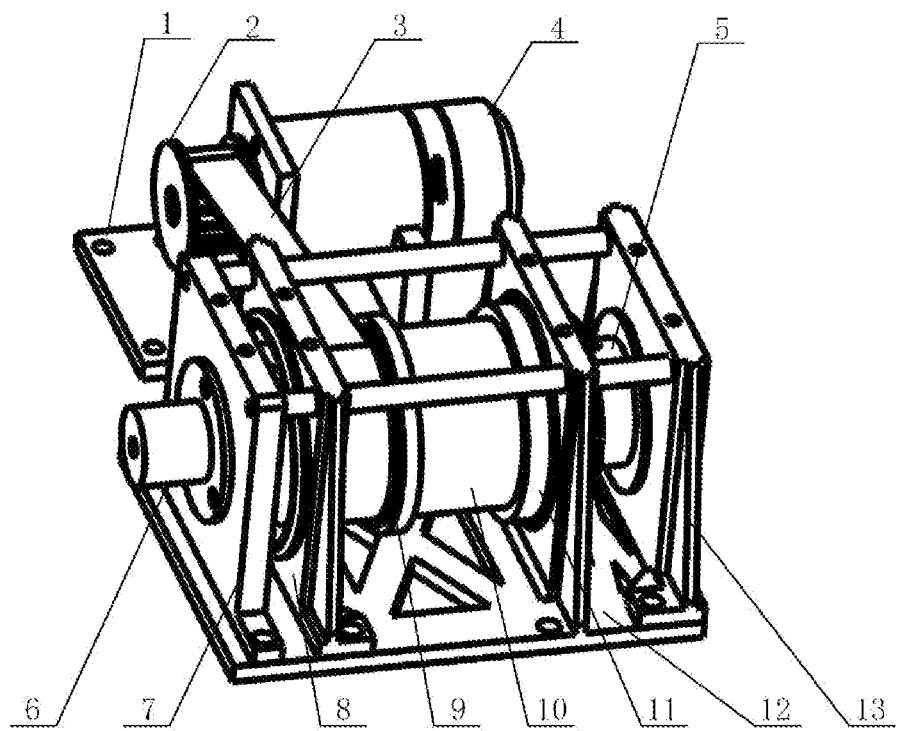
FIG. 3 is a diagram of a self-made magnetorheological damper module according to the present disclosure.
Figure 4:
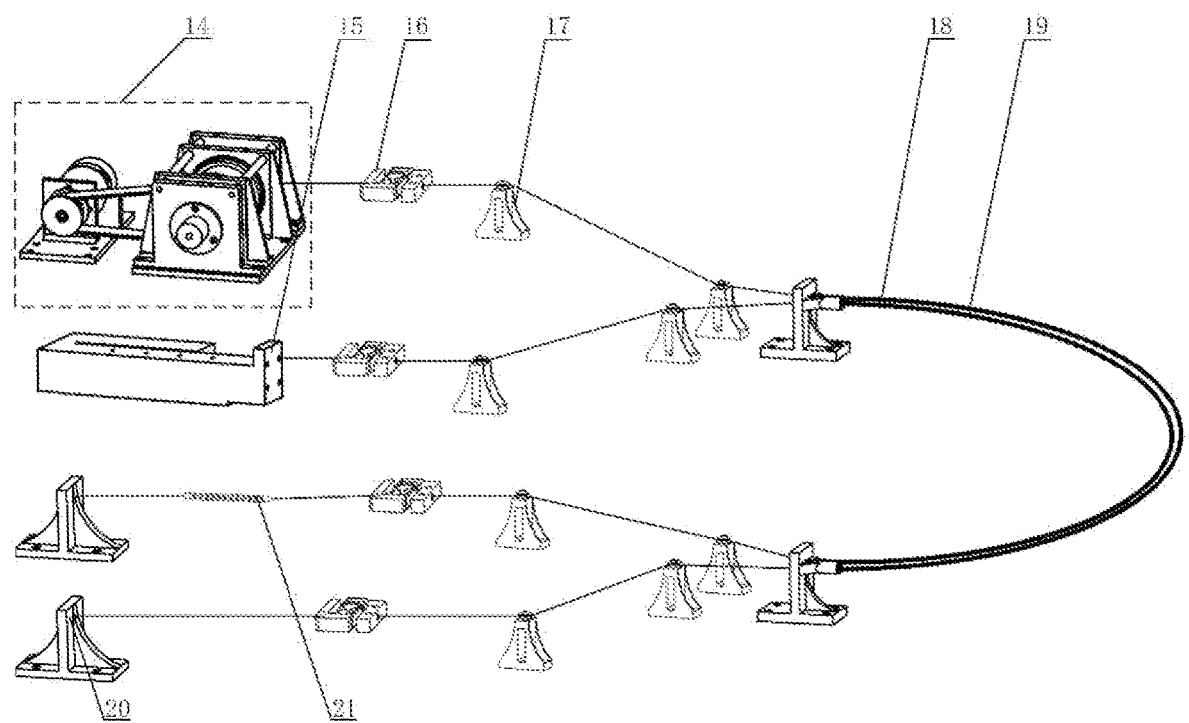
FIG. 4 is a schematic diagram of an experimental setup of a force control method according to the present disclosure.

A simulation test platform is shown in FIG. 4. According to the real-time force control method provided herein, in order not to affect flexibility of an end, the auxiliary cable Bowden system uses a method for fixing the end, and it is difficult for a traditional electric motor to maintain force control under the condition of long-term blocked rotation. Therefore, a magnetorheological damper module 14 is self-made. Specific parts of the module are shown in FIG. 3. In the test platform, a spring 21 serves as an external load simulation actuator, and sets an expected force value at a distal end of the power cable Bowden system, and a corresponding expected input value may be obtained through an inverse control model $F_{in} = F_{out} \cdot e^{-\mu\lambda\theta}$, and an angle value of the power cable Bowden system may be calculated in real time by the auxiliary cable Bowden system, since an effect of real-time force control may be achieved.

The technical means disclosed in the solution of the present disclosure is not limited to the technical means disclosed in the above embodiments, and further include technical solutions consisting of any combination of the above technical features. It should be pointed out that those of ordinary skill in the technical field can further make several improvements and modifications without departing from the principle of the present disclosure, and these improvements and modifications should also fall within the scope of protection of the present disclosure.

What is claimed is:

1. A cable force control method applicable to a time-varying configuration of a cable-driven system, the cable-driven system comprising a power cable Bowden system, an auxiliary cable Bowden system arranged adjacent to the power cable Bowden system, a plurality of tension sensors configured to measure forces on the Bowden systems, and a motor-driven actuator operably connected to the power cable Bowden system, the method comprising:

step 1, establishing a friction model, and calibrating parameters, wherein a quasi-static equilibrium equation of a (s+ds) segment in a cable is indicated as:

$$\begin{cases} dF(s,t) = \lambda f(s,t) \\ f(s,t) = \mu N(s,t) \\ N(s,t) = F(s,t)\kappa(s,t)ds \\ F'(s,t) = [F(s+ds,t) - F(s,t)]/ds \end{cases} \quad (1)$$

wherein $F(s,t)$, $F(s+ds,t)$, $N(s,t)$, $f(s,t)$ and $\kappa(s,t)$ indicate a cable tension at a position s, a cable tension at a position s+ds, a positive pressure, a friction force and curvature respectively under the condition of time t; $\lambda = \text{sign}[F'(s)]$ is currently defined, such that $$\frac{F'(s,t)}{F(s,t)} = \mu\lambda\kappa(s,t) \quad (2)$$

is obtained according to the formula (1), wherein $\lambda$ indicates a direction of cable friction; then the formula (2) is integrated on an interval (s+ds), such that the following expression $$F(s+ds,t) = F(s,t) \cdot e^{\mu\lambda \int_s^{s+ds} \kappa(s,t)ds} \quad (3)$$

is obtained;

the above expressions are extended to a total length L, such that $$F(L,t) = F(0,t) \cdot e^{\mu\pi\theta} \text{ is obtained,} \quad (4)$$

wherein $\mu$ and $\theta$ indicate a friction coefficient and a total bending angle of the cable respectively; $F_{out} = F(L,t)$, $F_{in} = F(0,t)$ is currently set, such that $$\theta = \frac{\ln\left(\frac{F_{out}}{F_{in}}\right)}{\mu\lambda} \quad (5)$$

is obtained by means of the formula (4); and in order to reduce an error between a model and experimental data, the parameter $\mu$ is optimized according to the following optimization rule:

$$\min \frac{\sum_{i=1}^{N}\left(F_{out} - \hat{F}_{out}\right)^2}{N}, \quad (6)$$

wherein $F_{out}$, $\hat{F}_{out}$ and N indicate a force value actually measured, a force value predicted by the model and the times of sampling respectively; and step 2, calculating the parameters in real time, and controlling a force, which comprise:

S1, identifying the parameters according to the friction model to obtain parameters of the auxiliary cable Bowden system and a power Bowden system: a friction coefficient $\mu^a$ of the auxiliary cable Bowden system, and a friction coefficient $\mu^p$ of the power cable Bowden system;

S2, calculating the auxiliary cable Bowden system $\theta^a$ in real time according to the model and a force value of a sensor, and using same as a cable bending angle of the power cable Bowden system $\theta^p$; and S3, obtaining an inverse control formula $F_{in}=F_{out}\cdot e^{-u\lambda\theta}$ according to the friction model, bringing the power cable Bowden system $\theta^p$ into the inverse control formula to serve as a feedforward controller to calculate a corrected input force, and controlling the motor-driven actuator based on the corrected input force to apply tension to the power cable Bowden system, so as to achieve an effect of real-time force control.

2. The cable force control method applicable to a time-varying configuration according to claim 1, wherein in the step S1, a proximal force is defined as an input force and a distal force is defined as an output force through tension sensors on the auxiliary cable Bowden system and the power cable Bowden system, and the parameters when an error is minimum are defined as $\mu^a$ and $\mu^p$ by means of calculation of the formula (6).

3. The cable force control method applicable to a time-varying configuration according to claim 1, wherein in the step S2, the auxiliary cable Bowden system sets an expected sinusoidal input, and the auxiliary cable Bowden system $\theta^a$ is calculated through the formula (5).

4. The cable force control method applicable to a time-varying configuration according to claim 1, wherein in the step S3, an expected force value at a distal end of the power cable Bowden system is set, a corresponding expected input value is obtained by means of an inverse control model $F_{in}=F_{out}\cdot e^{-u\lambda\theta}$, and an angle value of the power cable Bowden system is calculated in real time by the auxiliary cable Bowden system.

\* \* \* \* \*